United States Patent [19]

Brent

[11] Patent Number: 4,694,367
[45] Date of Patent: Sep. 15, 1987

[54] MECHANISM FOR MOVING RECORDING HEADS ACROSS COMPUTER TAPES

[75] Inventor: George I. Brent, Boulder, Colo.

[73] Assignee: Tallgrass Technologies, Inc., Overland Park, Kans.

[21] Appl. No.: 798,795

[22] Filed: Nov. 15, 1985

[51] Int. Cl.$^4$ .......................... G11B 5/55; G11B 21/08
[52] U.S. Cl. ................................... 360/106; 360/105; 360/109; 360/90
[58] Field of Search ............... 360/104, 105, 106, 109, 360/107, 129, 90

[56] References Cited

U.S. PATENT DOCUMENTS 3,544,114 12/1970 Malone et al. ........................ 360/106
4,307,426 12/1981 Aldenhoven .................... 360/109 X
4,609,958 9/1986 Irvin et al. ............................ 360/104

Primary Examiner—John H. Wolff
Assistant Examiner—Alfonso Garcia
Attorney, Agent, or Firm—Kokjer, Kircher, Bradley, Wharton, Bowman & Johnson

[57] ABSTRACT

A mechanism for moving a magnetic read/write recording head across a tape storage medium. A linear actuator drives an output shaft which carries a cable connector. A flexible cable is connected with the cable connector at one end and at the other end with an elevator bracket which carries the recording head. The cable is bent through a 90° bend between its ends along an arcuate guide surface. The elevator bracket moves up and down across the tape on guide pins. A spring maintains the cable under tension to translate horizontal extension and retraction of the actuator shaft into corresponding vertical movement of the tape head. The use of a cable reduces the application of moments to the head and avoids applying rotational forces.

20 Claims, 6 Drawing Figures

MECHANISM FOR MOVING RECORDING HEADS ACROSS COMPUTER TAPES

BACKGROUND AND SUMMARY OF THE INVENTION

This invention relates to a mechanism used to move a magnetic recording head across a tape storage medium.

In the operation of microprocessor based computers such as those commonly known as "personal" computers, magnetically encoded data are often stored on a magnetic tape having recording tracks extending lengthwise on the tape. A tape drive system drives the tape past a magnetic read/write head which enters encoded information onto the tape in the write mode of operation and extracts data from the tape in the read mode. The magnetic recording head must be capable of precise adjustment across the width of the tape so that it can read from and write on all of the recording tracks.

Various types of mechanical devices have been used to move the recording head across the tape. Typically, a linear actuator or an electric stepping motor is used as the drive component of the device, and the drive component moves the recording head up and down across the tape through a gear train or other mechanical drive system. Because it is desirable for the tape drive unit to have a low profile, the motor or actuator normally has a horizontal orientation, and it is necessary to use bevel gears or a similar mechanism to translate the output from the actuator into the necessary vertical movement of the recording head.

One of the principal problems with existing mechanisms is the substantial space they occupy. When gear trains are employed, they take up considerable space because of the necessary center to center distance between the mating sets of gears. Gear backlash can also be a problem. Without undue expense, it is difficult to provide a gear transmission which accurately positions the recording head within acceptable limits of accuracy. Gear drive systems suffer from the further disadvantage of applying rotational forces and moments to the recording head, and this can lead to binding and misalignment problems.

The present invention is directed to an improved tape head movement mechanism which eliminates the problems that have plagued existing devices. In accordance with the invention, a linear actuator is accurately located on a molded plastic base of the unit. The output shaft of the actuator carries a cable connector having a socket for receiving a ball which is crimped onto one end of a stainless steel cable coated with nylon. The cable extends along an arcuate surface on the base which guides the cable through a gradual 90° bend so that the end opposite the cable connector moves up and down when the actuator shaft is extended and retracted. The vertically oriented end of the cable carries a larger ball which is received in a pocket formed on an elevator bracket. The tape head is glued to the elevator bracket, and the bracket is accurately guided up and down along a pair of guide pins. A spring acting on the bracket maintains the cable under tension so that extension and retraction of the actuator shaft is translated into corresponding up and down movement of the recording head.

It is a particularly important feature of the invention that the guide pins are situated close to the tape head and to one another. The construction of the unit also permits the cable to connect with the elevator bracket at a location midway between the guide pins. Consequently, significant moments are not applied to the bracket, and the tendency for the bracket to bind is reduced in comparison to mechanisms in which the tape head is subjected to large moment forces. The cable drive arrangement is improved in comparison to gear drive systems because the cable applies no rotational forces to the tape head or bracket, so twisting is not a problem. At the same time, the mechanism achieves a one to one correlation between the movement of the actuator shaft and tape head, thus allowing the tape head to be precisely positioned on the tape.

BRIEF DESCRIPTION OF THE DRAWINGS

In the accompanying drawings which form a part of the specification and are to be read in conjunction therewith and in which like reference numerals are used to indicate like parts in the various views.

DETAILED DESCRIPTION OF THE INVENTION

Figure 1:
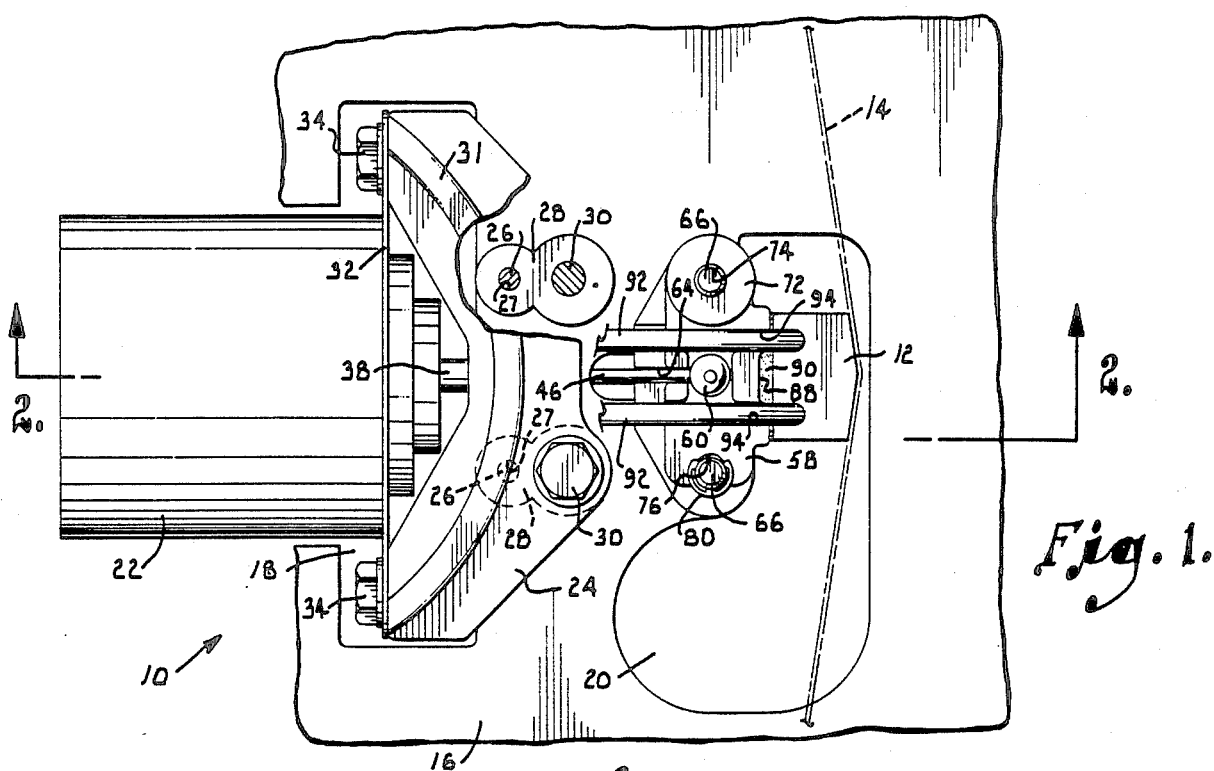
FIG. 1 is a fragmentary top plan view of a tape head movement mechanism constructed according to a preferred embodiment of the present invention, with a portion broken away for purposes of illustration.

Referring now to the drawings in more detail, numeral 10 generally designates a mechanism which is used to move a magnetic read/write head 12 across a tape 14 (see FIG. 1) having a magnetic coating for receiving and storing magnetically encoded data. The mechanism 10 can be used in microprocessor based computers of the type commonly known as "personal" computers, although other uses are possible. The recording head 12 must be capable of movement across the width of the tape 14 so that it can read data from and record data on all of the parallel recording tracks which extend lengthwise on the tape.

Mechanism 10 has a molded plastic base 16 which takes the form of a flat horizontal plate having cutouts 18 and 20. An electrically driven linear actuator 22 is accurately located on the base plate 16 by a wing-shaped mounting bracket 24. A pair of locating pins 26 (FIG. 1) project from the underside of the mounting bracket 24 and are received in mating openings 27 formed in a pair of bosses 28 formed on the upper surface of base 16 adjacent cutout 18. A pair of self-tapping screws 30 are extended through bracket 24 and threaded into the bosses 28 in order to secure bracket 24 on base 16 at a precise location determined by the locating pins 26 and the mating openings 27 which receive the locating pins. A curved stiffening rib 31 is formed on the top surface of bracket 24.

The linear actuator 22 has a generally cylindrical body provided with a mounting flange 32. A pair of self-tapping screws 34 are extended through the mounting flange 32 and are threaded into lugs 36 formed on bracket 24 in order to mount actuator 22 at an accurately determined location on base 16. The body of actuator 22 projects through cutout 18, and the actuator has a lead screw forming an extensible and retractable output shaft 38. The output shaft 38 is horizontal and extends above base 16 into a generally rectangular channel 40 (see FIG. 4 in particular). The channel 40 is defined between bosses 28 on its opposite sides and between base 16 at the bottom and the plate-like body of bracket 24 at the top.

The actuator 22 is a digital actuator having a threaded connection with the lead screw or shaft 38. When the actuator is energized in the extension mode, it turns in a direction to extend shaft 38. In the retraction mode, shaft 38 is axially retracted. Preferably, each pulse applied to the actuator 22 effects rotation of 15°, and each 15° increment of rotation advances or retracts shaft 38 by 0.001 inch. Thus, each pulse applied to actuator 22 in the extension mode causes shaft 38 to extend horizontally by 0.001 inch, and each pulse in the retraction mode retracts the output shaft by 0.001 inch.

Figure 2:
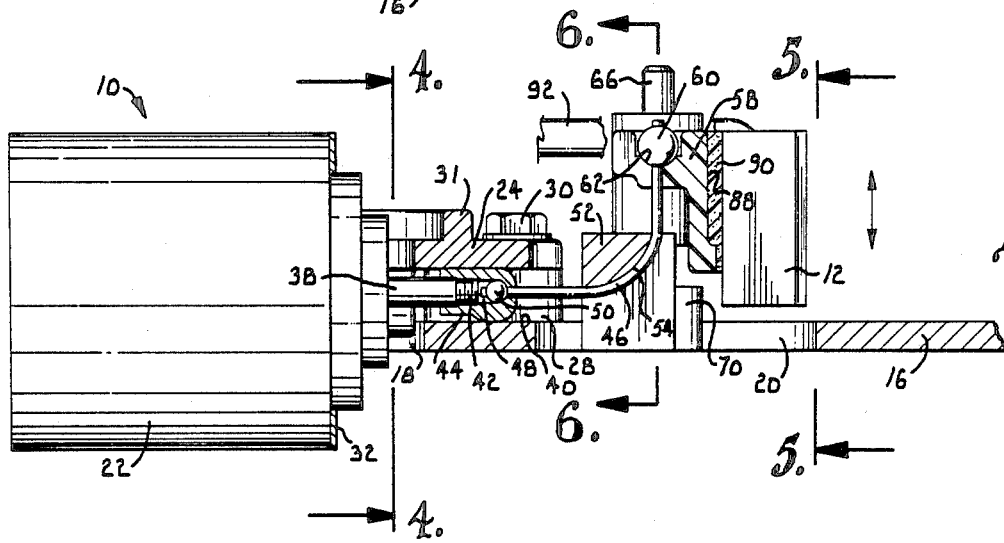
FIG. 2 is a fragmentary sectional view taken generally along line 2—2 of FIG. 1 in the direction of the arrows, with the tape head fully extended to its uppermost position.
Figures 3, 4:
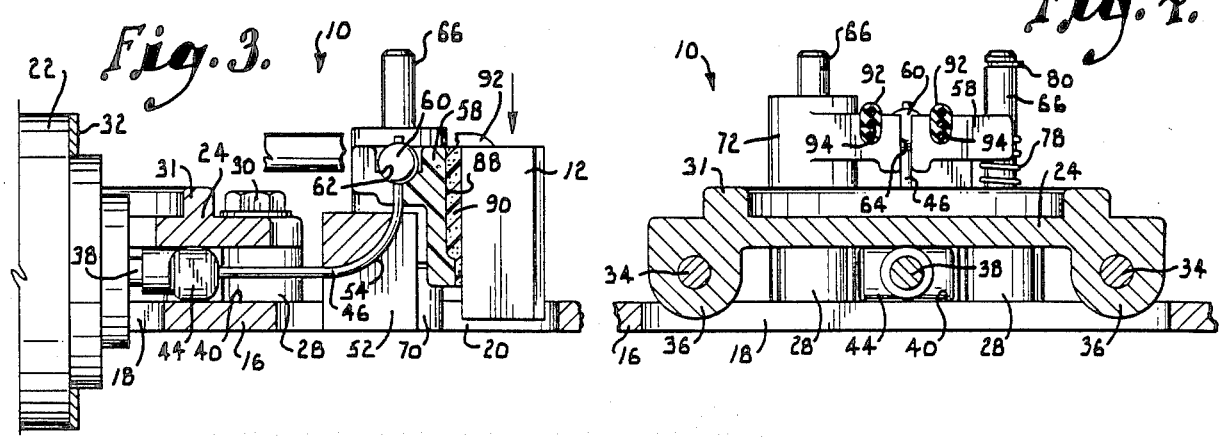
FIG. 3 is a fragmentary sectional view similar to FIG. 2, but showing the tape head fully retracted to its lowermost position.
FIG. 4 is a fragmentary sectional view taken generally along line 4—4 of FIG. 2 in the direction of the arrows.

As best shown in FIG. 2, the leading end of shaft 38 is threaded at 42, and an internally threaded cable connector 44 is tightly threaded onto the threads 42 and secured by a suitable thread compound. As best shown in FIG. 4, part of the cable connector 44 has a rectangular configuration and fits closely in the rectangular channel 40. The close fit of the cable connector 44 in channel 40 keeps the cable connector and shaft 38 from rotating and thus assures that operation of the actuator 22 results only in linear extension and retraction of shaft 38 and the cable connector carried thereon.

A flexible cable 46 extends into the leading end of the cable connector 44 and into a socket 48 (FIG. 2) formed within the cable connector. The socket 48 provides a curved seat against which a small stainless steel ball 50 is seated. Ball 50 is crimped or otherwise secured on one end of the flexible cable 46. Preferably, cable 46 is a stainless steel cable having a diameter of 0.014 inch with a 0.002 inch coating of nylon, giving the cable a finished diameter of 0.018 inch. The ball 50 may be 0.062 inch in diameter, and its engagement with the seat formed within cable connector 44 couples one end of the cable with the cable connector.

A block 52 which extends upwardly from base 16 is provided with an internal guide surface 54. The guide surface 54 is arcuate and extends through an arc of 90°. Block 52 has a slot 56 (see FIG. 6) which is wide enough to receive the cable 46 to enable the cable to be fitted through slot 56 and engaged against the arcuate guide surface 54. The arcuate configuration of surface 54 guides cable 46 gradually through a 90° bend such that its lower end portion has a horizontal orientation and its upper end portion has a vertical orientation.

Cable 46 extends upwardly out of block 52, and its upper end portion is extended through an elevator bracket 58 which carries the recording head 12. A ball 60 is crimped or otherwise secured on the upper end of cable 46 and is located in a recessed pocket 62 which is formed in the upper surface of bracket 58 to provide a seat for ball 60. Engagement of the ball 60 with the seat provided by pocket 62 serves to couple cable 46 with the elevator bracket 58. Ball 60 is somewhat larger than ball 50 and may have a diameter of 0.125 inch. Stainless steel, brass or another suitable material may be used to form the ball 60. As best shown in FIG. 4, a slot 64 in the back side of bracket 58 extends to the pocket 62 and is large enough to accept cable 46.

Figure 6:
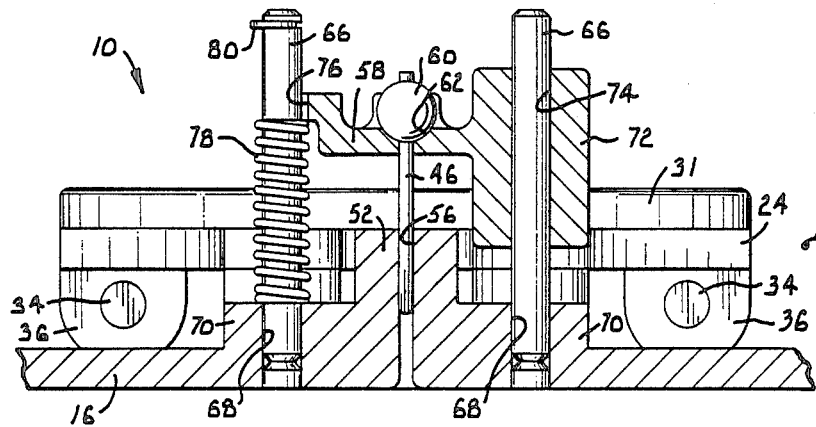
FIG. 6 is a fragmentary sectional view on an enlarged scale taken generally along line 6—6 of FIG. 2 in the direction of the arrows.

The elevator bracket 58 is mounted for up and down sliding movement on a pair of spaced apart and parallel guide pins 66. The guide pins 66 are vertical and may be smoothly finished stainless steel. As best shown in FIG. 6, the lower ends of the guide pins 66 extend closely through precisely located passages 68 formed in a pair of bosses 70 located on base 16 on opposite sides of block 52. The precise locations of the passages 68 and the close fit of pins 66 in the passages accurately locates the guide pins on base 16. One side of bracket 58 takes the form of a barrel 72 through which a passage 74 is formed. One of the guide pins 66 extends closely through passage 74 in order to restrict movement of bracket 58 to up and down movement axially on the guide pins 66. The other guide pin 66 extends through a slot 76 formed in the opposite side of bracket 58. The fit of pin 66 in slot 76 prevents bracket 58 from rotating and assists the other pin in guiding up and down movement of the elevator bracket. Pins 66 are straight within close tolerances to accurately locate and guide the elevator bracket 58.

A compression spring 78 is coiled around one of the guide pins 66 and acts at its bottom end against boss 70 and at its top end against bracket 58. Spring 78 thus acts to urge bracket 58 upwardly at all times and supplies a force which maintains cable 46 under continuous tension. The tension in cable 46 keeps ball 50 properly seated in cable connector 44 and ball 60 properly seated on bracket 58. A retainer clip 80 is fitted in a groove in the top end of one of the guide pins 66 in order to retain bracket 58 on the guide pins.

Figure 5:
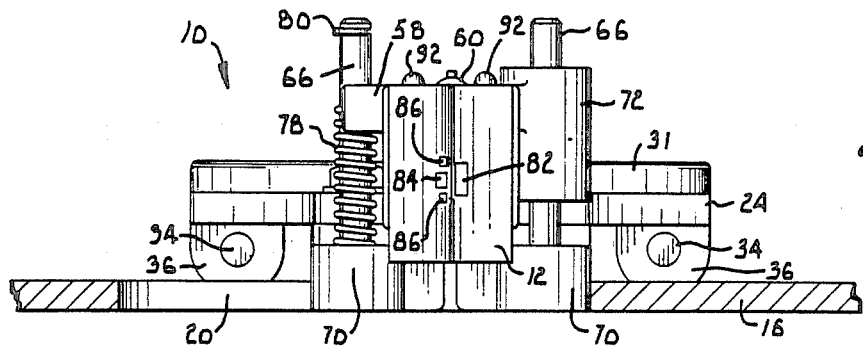
FIG. 5 is a fragmentary end elevational view taken generally along line 5—5 of FIG. 2 in the direction of the arrows.

The recording head 12 may be a conventional magnetic read/write head having a write core 82, a read core 84 and a pair of write closure cores 86 (see FIG. 5). A glue pocket 88 is formed on the front face of bracket 58 and receives a quantity of glue 90 used to glue the recording head 12 to the elevator bracket 58. The position and alignment of head 12 is precisely determined before application of the glue 90 so that the head will be properly oriented relative to the tape 14.

Electrical signals are carried to and from the recording head 12 by conductor wires contained in a pair of electrical cables 92. A pair of grooves 94 are formed in the top surface of bracket 58 in order to closely receive the electrical cables 92. The extension of the cables 92 through grooves 94 conserves valuable space in the unit.

In use of the mechanism 10, the recording head 12 is moved up across tape 14 by energizing actuator 22 in the extension mode to extend the actuator shaft 38 and the cable connector 44. Because of the force applied to bracket 58 by spring 78, bracket 58 moves upwardly to the extent permitted by cable 46. Since the length of the cable is fixed, bracket 58 moves upwardly a distance equal to the distance the actuator shaft 38 is extended. Each pulse applied to actuator 22 extends shaft 38 by 0.001 inch and raised head 12 the same distance. The position of the recording head 12 across tape 14 can thus be accurately adjusted.

When the actuator shaft 38 is retracted, cable 46 pulls bracket 58 downwardly against the force exerted by the compression spring 78. Again, the fixed length of cable 46 results in a one to one correlation between the vertical movement of the recording head 12 and the horizontal movement of shaft 38. As the recording head 12 is moved up and down, cable 46 slides along the guide surface 54, and the gradual curvature of surface 54 reduces the wear on the nylon coating of the cable.

The manner in which the mechanism 10 is constructed permits the guide pins 66 to be located close to the recording head 12 and to one another. It is also important to note that the pocket 62 is located midway between the two guide pins 66 and is centered on a straight line extending between the guide pins. Consequently, the force applied to bracket 58 by cable 46 is applied midway between and parallel to the guide pins, and there are no significant moments applied that can create binding forces tending to cause binding between the guide pins 66 and bracket 58. The use of a cable 46 also avoids the application of rotational forces to the elevator bracket 58. Therefore, there is no tendency for bracket 58 to become twisted and possibly bind on the guide pins 66.

The cable connector 44 performs multiple functions. The cable connector is threaded onto the lead screw or shaft 38 and provides the socket 48 in which one end of cable 46 is captured by means of ball 50. In addition, the rectangular configuration of the cable connector 44 and its close fit in channel 40 prevents shaft 38 from rotating and thus assures that actuator 22 effects only linear motion.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, I claim:

1. A mechanism for moving a magnetic recording head across a tape storage medium, said mechanism comprising:
   a fixed base;
   an actuator on said base having an extensible and retractable output shaft;
   an elongate flexible cable having opposite first and second ends;
   means for coupling said first end of the cable with said shaft;
   cable guide means on said base for guiding said cable through a bend of substantially 90° between said first and second ends;
   a bracket carrying the recording head thereon, said bracket being coupled with said second end of the cable;
   means for mounting said bracket on said base in a manner restricting the bracket to linear movement in a direction generally transverse to the tape and perpendicular to the direction of movement of said actuator shaft; and
   means for maintaining said cable in a tense condition to effect movement of said bracket and recording head across the tape in opposite directions when said actuator extends and retracts said shaft.

2. The mechanism of claim 1, wherein said coupling means comprises a cable connector carried on one end of said shaft, said first end of the cable being connected with said cable connector.

3. The mechanism of claim 2, including mating surfaces on said base and cable connector for preventing rotation of the cable connector during extension and retraction of said shaft.

4. The mechanism of claim 2, including:
   a ball secured on said first end of the cable; and
   a seat within said cable connector, said ball fitting against said seat to connect the first end of said cable with said cable connector.

5. The invention of claim 4, including:
   a second ball secured on said second end of the cable; and
   a seat on said bracket for receiving the second ball to couple said second end of the cable with said bracket.

6. The mechanism of claim 1, wherein said cable guide means comprises an arcuate guide surface on said base curving through an arc of substantially 90°, said cable extending along said guide surface.

7. The mechanism of claim 1, wherein said maintaining means comprises a spring urging said bracket generally away from said base.

8. The mechanism of claim 1, wherein said mounting means for said bracket comprises:
   a pair of substantially straight pins on said base extending therefrom parallel to one another and perpendicular to the direction of movement of said shaft; and
   a pair of openings in said bracket through which said pins closely extend to permit the bracket to slide along the pins axially thereon.

9. The mechanism of claim 8, wherein said bracket is coupled with said second end of the cable at a location on the bracket substantially midway between said pins.

10. The mechanism of claim 8, wherein said maintaining means comprises a compression spring coiled on one of said pins and having opposite ends acting against said base and bracket to continuously urge the bracket away from the base.

11. The mechanism of claim 1, wherein said cable is a steel cable having a nylon coating thereon.

12. The mechanism of claim 1, wherein said recording head has an electrical cable and said bracket has a groove through which said electrical cable closely extends.

13. The mechanism of claim 1, including:
   a mounting plate to which said actuator is fixedly mounted;
   locator pin means for locating said mounting plate at a preselected location relative to said base; and
   means for securing said mounting plate to said base at said preselected location.

14. In a mechanism for moving a magnetic recording head across a tape storage medium, the combination of:
   a fixed base;
   a linear actuator mounted on said base, said actuator driving an extensible and retractable output shaft;
   an elongate flexible cable having opposite first and second ends;
   a cable connector on said shaft, said cable connector receiving said first end of the cable;

means for preventing rotation of said cable connector during extension and retraction of said shaft;

an arcuate guide surface on said base along which said cable extends through a bend of substantially 90° between said first and second ends;

a bracket mounted on said base for linear movement in a direction transverse to the tape and perpendicular to the direction of movement of said actuator shaft, said bracket carrying the recording head thereon and being coupled to said second end of the cable; and spring means for urging said bracket in a direction to maintain said cable under tension, whereby extension and retraction of said actuator output shaft effects movement of said bracket and recording head across the tape in opposite directions.

15. The invention of claim 14, including:
a socket within said cable connector presenting a seat; and
a ball secured on said first end of the cable and seated against said seat.

16. The invention of claim 14, including:
a pair of substantially straight pins on said base extending therefrom parallel to one another and perpendicular to the direction of movement of said shaft; and
a pair of openings in said bracket through which said pins closely extend to permit the bracket to slide along the pins axially thereon.

17. The invention of claim 16, wherein said bracket is coupled with said second end of the cable at a location on the bracket substantially midway between said pins.

18. In a magnetic recording head movement mechanism having a fixed base, a linear actuator driving an extensible and retractable shaft, and a bracket for carrying the recording head across a magnetic tape, the improvement comprising:

an elongate flexible cable having opposite first and second ends;

a cable connector mounted on said shaft for extension and retraction therewith;

means for connecting said first end of the cable with said cable connector;

a guide channel on the base in which said cable connector moves, said guide channel preventing said cable connector from rotating during extension and retraction of the shaft;

a cable guide surface on the base guiding said cable through a bend of substantially 90° between said first and second ends;

a guide pin on said base extending generally perpendicular to the direction of movement of said cable connector, said bracket being received on said guide pin for movement axially thereon;

spring means for urging said bracket along said guide pin in a direction away from the base; and means for coupling said second end of the cable with said bracket to effect reciprocating movement of the recording head in a direction perpendicular to the direction of movement of said cable connector when the actuator shaft is extended and retracted.

19. The improvement of claim 18, including a second guide pin on said base extending parallel to the first mentioned guide pin and being spaced therefrom, said bracket being received on said first and second guide pins for movement axially thereon.

20. The improvement of claim 19, wherein said second end of the cable is coupled with said bracket at a location on the bracket substantially midway between said first and second guide pins.

* * * * *